(12) United States Patent
Lu et al.

(10) Patent No.: US 8,452,672 B2
(45) Date of Patent: May 28, 2013

(54) METHOD FOR MANAGING THE HARDWARE DEVICE

(75) Inventors: Zhou Lu, Beijing (CN); Huazhang Yu, Beijing (CN)

(73) Assignee: Fetian Technologies Co., Ltd. (CN)

( * ) Notice: Subject to any disclaimer, the term of this patent is extended or adjusted under 35 U.S.C. 154(b) by 1267 days.

(21) Appl. No.: 11/870,814

(22) Filed: Oct. 11, 2007

(65) Prior Publication Data

US 2008/0088455 A1 Apr. 17, 2008

(30) Foreign Application Priority Data

Oct. 12, 2006 (CN) .......................... 2006 1 0113672
Oct. 19, 2006 (CN) .......................... 2006 1 0150609

(51) Int. Cl.
*G06Q 10/00* (2012.01)
(52) U.S. Cl.
USPC .......................................................... 705/28
(58) Field of Classification Search
None
See application file for complete search history.

(56) References Cited

U.S. PATENT DOCUMENTS 5,499,294 A * 3/1996 Friedman ...................... 713/179
6,397,334 B1 * 5/2002 Chainer et al. ................ 713/176
2005/0140502 A1 * 6/2005 Ashizawa .................. 340/10.52

OTHER PUBLICATIONS

NPL_index, Hash Table, downloaded from http://en.wikipedia.org/wiki/Hash_table on May 14, 2010, 14 pages.*
NPL_one_way, Cryptographic Hash Function, downloaded from http://en.wikipedia.org/wiki/Cryptographic_hash_function on May 14, 2010, 8 pages.*

* cited by examiner

*Primary Examiner* — Paul Danneman
(74) *Attorney, Agent, or Firm* — Richard M. Klein; Fay Sharpe LLP

(57) ABSTRACT

The invention discloses a method for managing the hardware device including the hardware device manufacture and management. Steps of the manufacture: Get the RFID internal serial number; Generate the hardware ID number according to the said RFID internal serial number; Generate the external sequence number of hardware according to the said RFID internal serial number; Manufacture the hardware device with RFID internal serial number, hardware ID number and external sequence number. Steps of management: Create the user database by the said RFID internal serial number; Manage the hardware device by indexing RFID internal serial number, hardware ID number or external sequence number. In the present invention, the RFID internal number is read directly by the RFID reader. The operation is simplified by ignoring the copy and online read. RFID is used for managing the hardware device; which improves the anti-counterfeit capability of the information security device as well.

15 Claims, 4 Drawing Sheets

METHOD FOR MANAGING THE HARDWARE DEVICE

FIELD OF THE INVENTION

The present invention relates to a method for managing the hardware device, and more particularly, a method for managing the hardware device by three-in-one way that combined RFID internal serial number, hardware ID number, and hardware external sequence number.

BACKGROUND OF THE INVENTION

In the process of manufacture and sale of the hardware device, the manufacturer and agent have to record the external sequence number of every hardware device before sale, and then connect it with the computer and read its internal hardware ID number, store the said sequence number and hardware ID number into the user database built by the manufacturer and/or agent, so that the user can check them if necessary. However, the registration work becomes quite complex when selling a large quantity of hardware devices.

In the prior art, a number is transformed into a new one by:
1. Mathematical operation based on the original number;
2. Binary Digit extension based on the original number;
3. Apply some standard encryption algorithms as RSA Algorithm, DES Algorithm, TEA Algorithm etc.

RFID is the abbreviation of Radio Frequency Identification. RFID technology is that embeds the micro-chip into the product, by which the reader can get the number when micro-chip automatically send the information such as serial number of the product etc. to it.

The serial number is internationally unique and can not be counterfeited or modified.

As basis of information standardization and a high technology of quick, real-time, correct information collection and processing, RFID is widely used in many industries as production, retail, logistic and traffic for its role of unique valid identification to the entities including retailing product, logistics unit, container, transportation package, parts etc.

RFID system consists of three parts:
RFID tag: it is made up of coupled elements and chip. Every tag has the only electro-code for identification that attached on the object. Usually RFID tag is called RFID for short.
RFID reader: it is the device that read (or write sometimes) the information of the tag. It can be designed as handheld or fixed one.
Antenna: it can transmit RF signal between tag and reader.
Hardware ID number: It is a global unique hardware inside hardware device and defined by the developer. The number is stored inside the hardware device and can be read by software. Usually the developer takes this number as the unique identification for hardware device.
Hardware external sequence number: it is a number burned by laser or generated by other ways before delivery and is used for reparation and identification.

SUMMARY OF THE INVENTION

Whereas the present method for managing the hardware device is complex with large working load, the present invention provides a method for managing the hardware device that combined the RFID internal serial number, hardware ID number and hardware external sequence number.

The following is the technical solution of the invention: a method for managing the hardware device, consisting of two parts: the hardware device manufacture and management.

Steps of hardware device manufacture:
Step 1: Get the RFID internal serial number;
Step 2: Generate the hardware ID number according to the said RFID internal serial number;
Step 3: Generate the external sequence number of hardware according to the said RFID internal serial number;
Step 4: Manufacture the hardware device with the said RFID internal serial number, hardware ID number and external sequence number.

Steps of hardware device management:
Step 1: Create the user database by the said RFID internal serial number;
Step 2: Manage the hardware device by indexing RFID internal serial number, hardware ID number or external sequence number.

The said RFID is fixed inside hardware device in a way of physical bonding and has the character of uniqueness.

The said hardware ID number is the ID number corresponding to RFID internal serial number.

The said hardware ID number is the associated ID number of RFID internal serial number.

The process of generating the hardware ID number by RFID internal serial number is completed outside the hardware device.

The process of generating the hardware ID number by RFID internal serial number is completed inside the hardware device.

The said external sequence number is the ID number corresponding to RFID internal serial number of the hardware device.

The said external sequence number is the associated ID number of RFID internal serial number.

The said association is realized by one-way algorithm.

The said one-way algorithm includes MD5, HMAC, SHA-1, CRC, SHA-256, MD4 or MD2.

The said association is realized by two-way algorithm.

The said two-way algorithm includes DES, 3DES, RC4, AES, RSA, ECC or TEA.

Recording the hardware external sequence number on the hardware device can be carried out by:
1) Burning the number on the hardware device by laser;
2) Spraying the said sequence number on the hardware device; or
3) Printing the said sequence number on label and put the label on the hardware device.

The said user database includes the RFID internal serial number, hardware ID number or hardware external sequence number.

The said user database is built by the way that RFID reader directly reads RFID internal serial number, or built by the generated hardware ID number or sequence number after reading RFID internal serial number.

Compared with the prior art, the effective benefits of the present invention are:
1) In the present invention, the RFID internal number is read directly by the RFID reader. The process is simplified by ignoring the copy and online read.
2) In the present invention, RFID is used in the hardware device management; which improve the anti-counterfeit capability of the information security device as well.

DETAILED DESCRIPTION OF THE PREFERRED EMBODIMENTS

Figure 1:
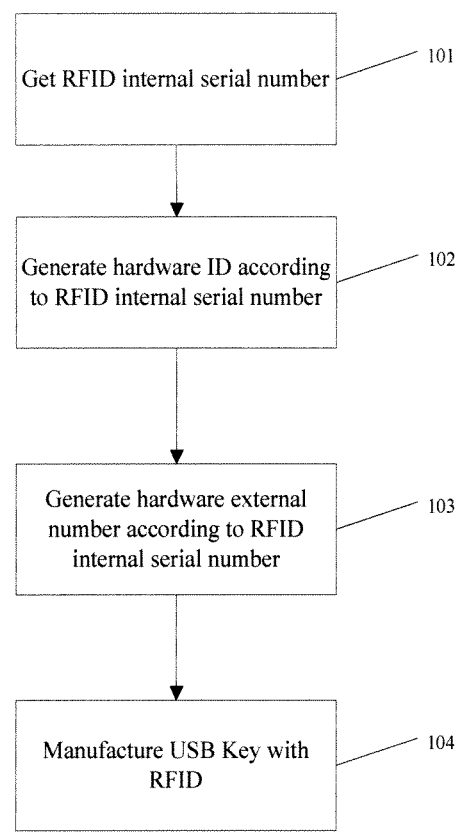
FIG. 1 shows the process for manufacturing the hardware device.

The present invention is further described with the embodiments and the drawing below, wherein USB Key as the example of the said hardware device.

Embodiment 1

In the embodiment, the whole process includes the manufacture and management of the USB Key.

Referring to FIG. 1, the invention provides the method for USB Key manufacture, which comprises of the following steps:

Step 101: Manufacturer gets the unique RFID internal serial number.

Step 102: A same hardware ID number is generated according to RFID internal serial number.

Step 103: A same sequence number is generated on the surface of USB Key according to RFID internal serial number.

Step 104: USB Key with the RFID internal serial number is manufactured.

Figure 2:
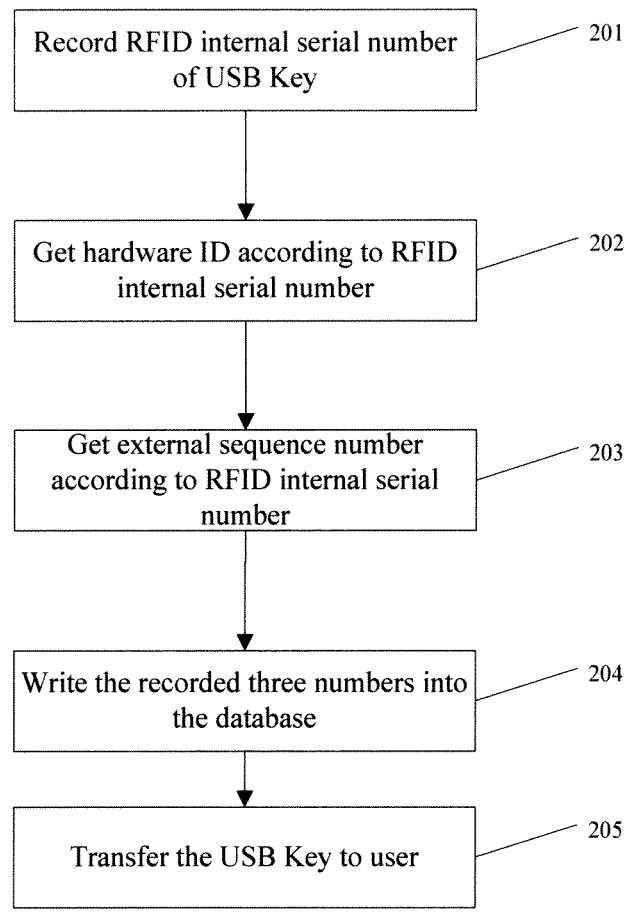
FIG. 2 shows the process for managing and distributing the hardware device.

Referring to FIG. 2, the invention provides the method for USB Key management, which comprises of the following steps:

Step 201: manufacturer records the RFID internal serial number inside the USB Key via RFID reader.

Step 202: Get the hardware ID number inside USB Key via RFID internal serial number.

Step 203: Get the sequence number on the USB Key surface via RFID internal serial number.

Step 204: Write the recorded RFID internal serial number, hardware ID number and external sequence number into the database.

Step 205: Send the registered USB Key to the user.

The user gets the said USB Key above, and can use the corresponding supportive software.

In the present embodiment, the step 102 can be replaced by: According to the RFID internal serial number, USB Key manufacturer use one-way or two-way algorithm to get the hardware ID number that related to the RFID internal serial number.

In the present embodiment, the step 103 can be replaced by: According to the RFID internal serial number, USB Key manufacturer use one-way or two-way algorithm to get the sequence number on the USB Key surface that related to the RFID internal serial number.

In the present embodiment, the adopted RFID internal serial number is 64-bit.

In the present embodiment, DES two-way algorithm is adopted. It can be carried out by the following program:

```
__int64    llRFID=0;
BYTE       key[24];
PBYTE      pData=(PBYTE)&llRFID;
memset(key,0,24);
. . .
```

-continued

```
GetDeivceRFID(&llRFID);
Des_SetKey(key);
Des_Encrypt(pData,8);
```

When the Des_Encrypt is called, the content in llRFID variable becomes the content converted from the original RFID by DES encryption algorithm. The content of llRFID is assigned a hardware ID number and an external sequence number to get the hardware ID number and external sequence number associated with the RFID internal serial number.

The internal serial number can be obtained from the hardware ID number or external sequence number by executing the decryption process in the same way as above.

In the present embodiment, one-way or two-way algorithm can be mathematically operated on every value in the RFID internal serial number; or binary digit extension for the whole RFID internal serial number, or other encrypt algorithm such as MD5, HMAC, SHA-1, HASH, CRC, SHA-256, MD4, MD2, DES, 3DES, RC4, AES, RSA, ECC or TEA.

Embodiment 2

Figure 3:
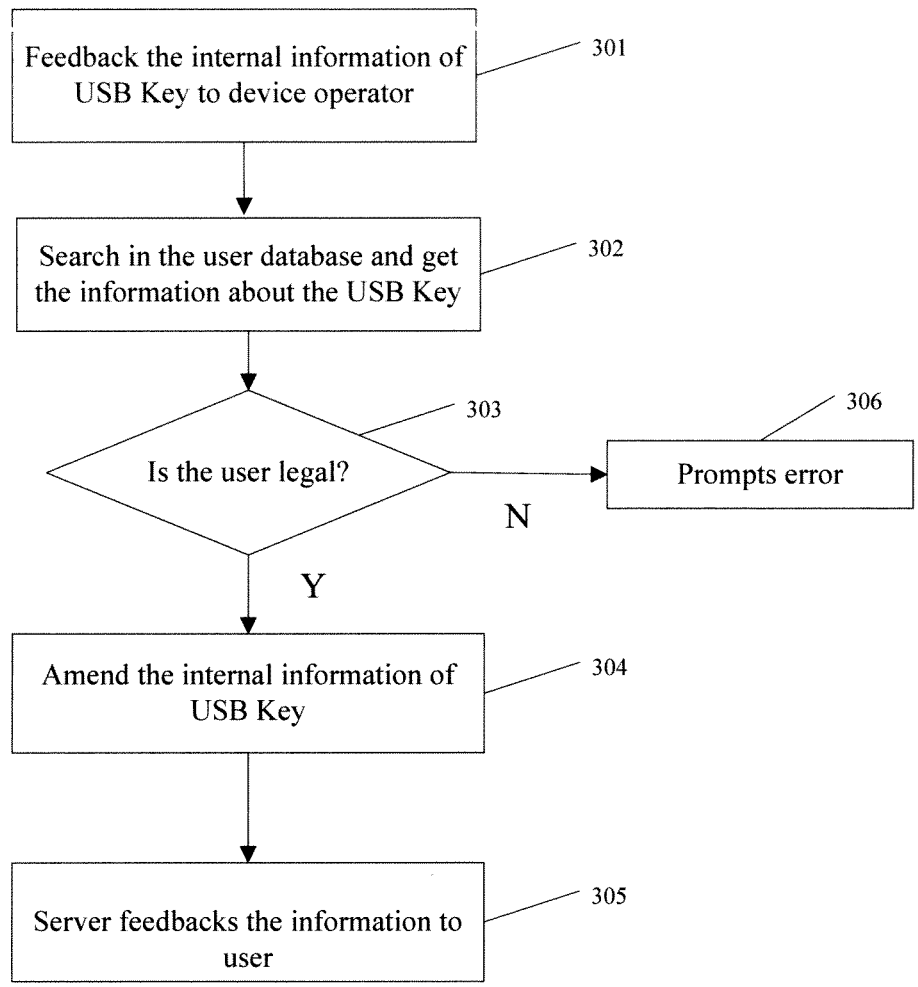
FIG. 3 shows the process that the user uses the hardware device.

Referring to FIG. 3, in the present embodiment the USB Key could not be used and need to be repaired. The details of repairing the USB Key are comprised of the following steps:

Step 301: User feedbacks the internal information of USB Key to device operator when getting prompts from computer that the hardware ID number is same as the others or arising other problems.

Step 302: Device operator searches the related information (generally RFID internal serial number) about the USB Key in the user database.

Step 303: Device operator checks the searched information (generally RFID internal serial number) to verify the identity of the user. If the user is legal one, go to step 304. If not, go to step 306.

Step 304: Server amends the internal information (generally hardware ID number) of USB Key for the legal user in the user database.

Step 305: Server feedbacks the amended information (generally hardware ID number) to the legal user.

User can use the original USB key when getting the feedback information.

The process flow in the present embodiment is also adapted to other cases, for example, updating the software for the USB Key etc.

Embodiment 3

Figure 4:
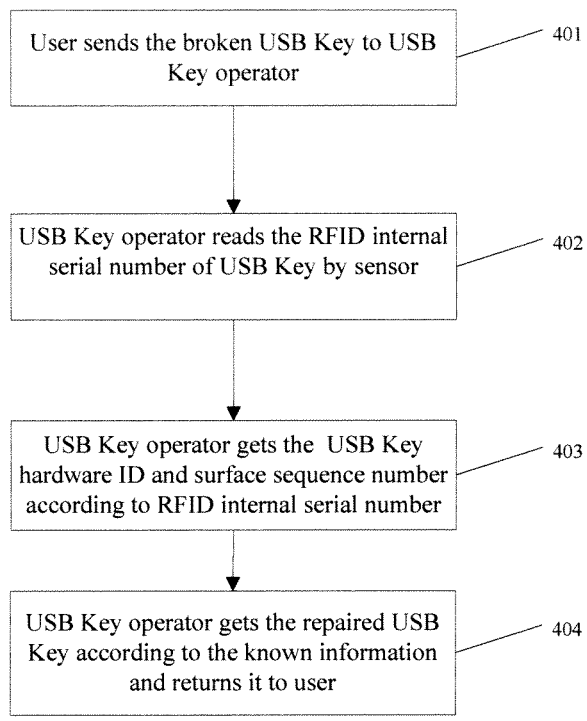
FIG. 4 shows the process for repairing the broken hardware device.

Referring to FIG. 4, in the present embodiment, the hardware device of the user is broken and the hardware ID number can not be read. It can be repaired by the following detailed steps:

Step 401: User sends the broken USB key back to USB Key operator.

Step 402: USB Key operator reads the RFID internal serial number of the said broken USB Key via RFID reader.

Step 403: USB Key operator gets the internal hardware ID number and external sequence number according to the read RFID internal serial number.

Step 404: USB Key operator repairs the USB Key according to the gained information or manufactures a new one according to the original RFID internal serial number, and sends the repaired or new USB Key back to the user.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method for managing the hardware device, comprising the hardware device manufacture and management, Wherein the steps of the said manufacture comprise:
step 1: get the RFID internal serial number;
step 2: generate the hardware ID number according to the said RFID internal serial number;
step 3: generate the external sequence number of hardware according to the said RFID internal serial number;
step 4: manufacture the hardware device with RFID internal serial number, hardware ID number and external sequence number;

and the steps of the said management comprise:
step 1: create a user database by the said RFID internal serial number;
step 2: manage the hardware device by indexing RFID internal serial number, hardware ID number or external sequence number, specifically,
when the hardware ID number of the hardware device needs to be corrected, search for the RFID internal serial number of the hardware device in the user database according to the internal information of the hardware device feedback by a legal user and modify the hardware ID number of the hardware device in the user database and send the modified hardware ID number back to the legal user;
when the hardware device is broken, read the RFID internal serial number of the hardware device of the broken hardware device, obtain the hardware ID number and the external sequence number of the hardware device according to the read RFID internal serial number and manufacture a new hardware device according to the RFID internal serial number, the hardware ID number and the external sequence number.

2. The said method for managing the hardware device of claim 1, wherein the said RFID is fixed inside hardware device in a way of physical binding and has the character of uniqueness.

3. The said method for managing the hardware device of claim 1, wherein the said hardware ID number is the ID number corresponding to RFID internal serial number.

4. The said method for managing the hardware device of claim 1, wherein the said hardware ID number is the associated ID number of RFID internal serial number.

5. The said method for managing the hardware device of claim 1, wherein the process of generating the hardware ID number by RFID internal serial number is completed outside hardware device.

6. The said method for managing the hardware device of claim 1, wherein the process of generating the hardware ID number by RFID internal serial number is completed inside hardware device.

7. The said method for managing the hardware device of claim 1, wherein the said external sequence number is the ID number corresponding to RFID internal serial number of the hardware device.

8. The said method for managing the hardware device of claim 1, wherein the said external sequence number is the associated ID number of RFID internal serial number.

9. The said method for managing the hardware device of claim 4 or 8, wherein the said association is realized by the one-way algorithm.

10. The said method for managing the hardware device of claim 9, wherein the said one-way algorithm includes MD5, HMAC, SHA-1, HASH, CRC, SHA-256, MD4 or MD2.

11. The said method for managing the hardware device of claim 4 or 8, wherein the said association is realized by two-way algorithm.

12. The said method for managing the hardware device of claim 11, wherein the two-way algorithm includes DES, 3DES, RC4, AES, RSA, ECC or TEA.

13. The said method for managing the hardware device of claim 1, wherein recording the hardware external sequence number on the hardware device can be carried out by:
1) burning the number on the hardware device by laser;
2) spraying the said sequence number on the hardware device; or
3) printing the said sequence number on label and put the label on the hardware device.

14. The said method for managing the hardware device of claim 1, wherein the said user database includes RFID internal serial number, hardware ID number or hardware external sequence number.

15. The said method for managing the hardware device of claim 1, wherein the user database is built by the way that RFID reader directly reads RFID internal serial number, or built by the generated hardware ID number or sequence number after reading RFID internal serial number.

* * * * *